Figure 3:
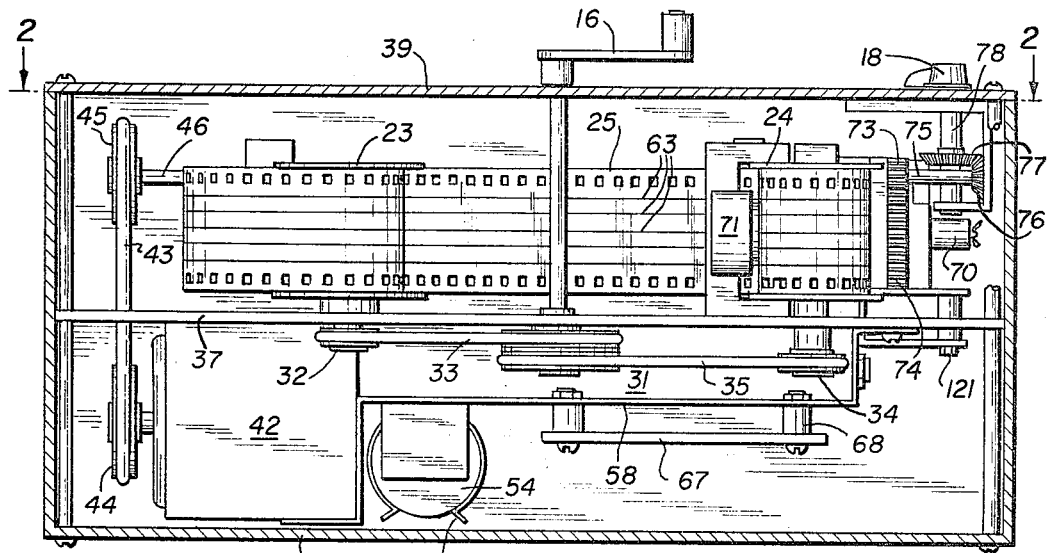

Nov. 29, 1966          P. E. FLEURY ETAL                3,287,830
                  VISUAL AND AURAL COMMUNICATION DEVICE
Filed April 27, 1964                              4 Sheets-Sheet 1
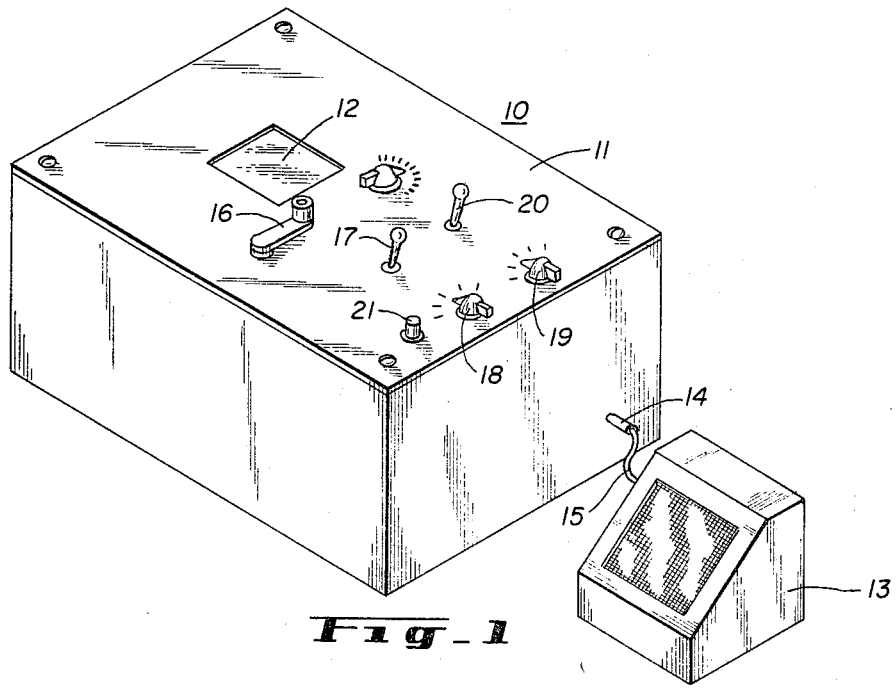
Fig_1
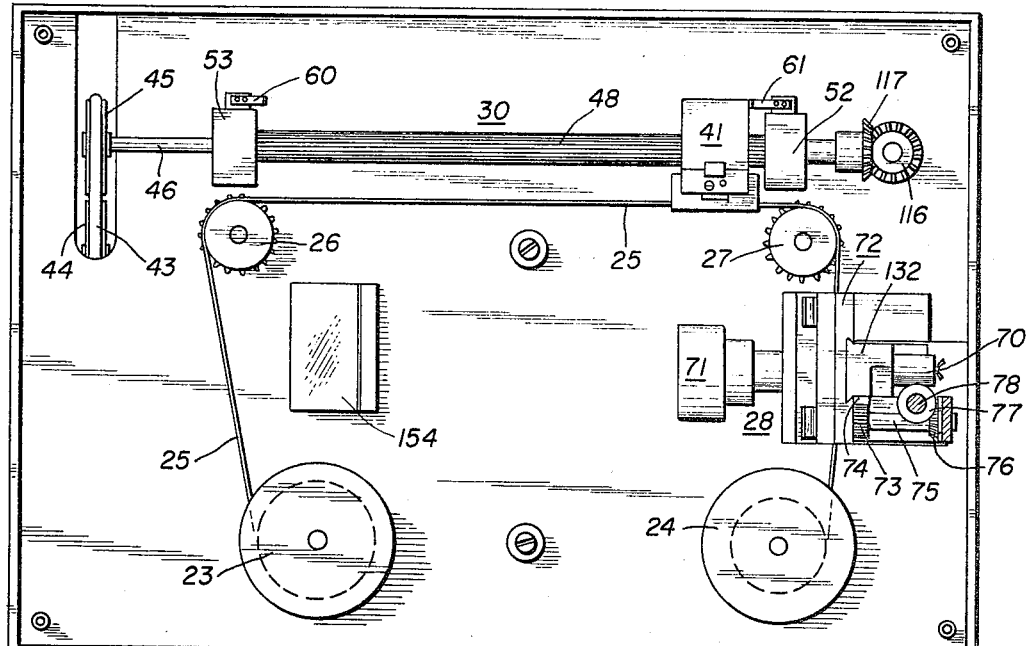
Fig_2
INVENTORS.
Paul E. Fleury
Raymond H. Appleton
BY McGrew and Edwards
ATTORNEYS Nov. 29, 1966  P. E. FLEURY ET AL  3,287,830
VISUAL AND AURAL COMMUNICATION DEVICE
Filed April 27, 1964  4 Sheets-Sheet 2

INVENTORS.
Paul E. Fleury
Raymond H. Appleton
BY McGrew Edwards
ATTORNEYS

INVENTORS.
Paul E. Fleury
Raymond H. Appleton

ATTORNEYS

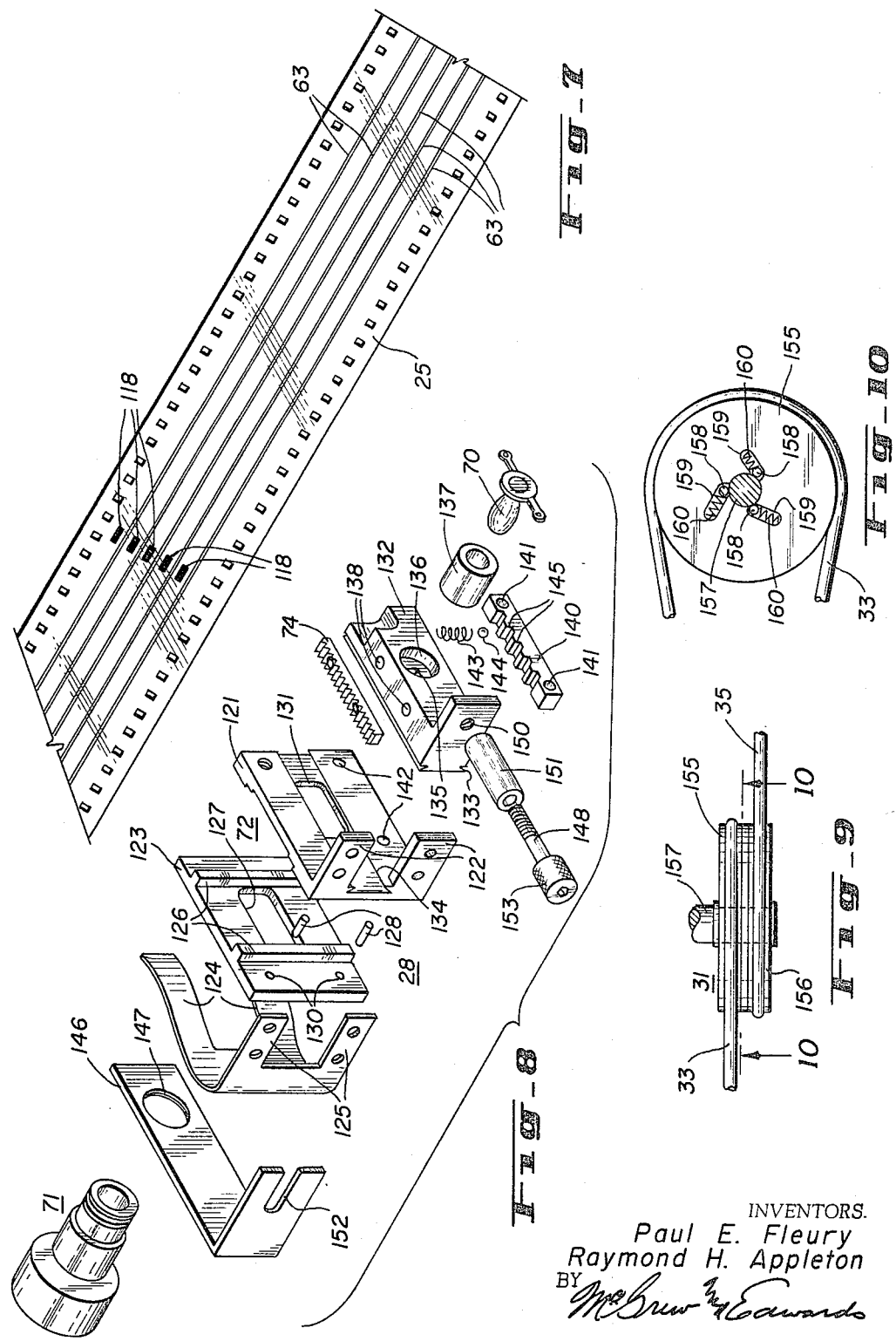

3,287,830
VISUAL AND AURAL COMMUNICATION DEVICE
Paul E. Fleury, Golden, and Raymond H. Appleton, Wheatridge, Colo., assignors of one-half to Joseph M. Gidding, New York, N.Y., one-fourth to Joseph Coors, and one-fourth to Paul E. Fleury, both of Golden, Colo.
Filed Apr. 27, 1964, Ser. No. 362,565
6 Claims. (Cl. 35—35)

This invention relates to apparatus for facilitating communication and particularly to an improved device for enabling persons speaking different languages to communicate with one another.

Modern high speed transportation and the greatly increased numbers of persons traveling about the world have brought about much need for communication between persons speaking different languages. Even a person speaking many languages finds himself having to communicate more in still other languages. Various types of devices and methods both visual and aural have been devised to assist those needing to communicate with others but faced with a language barrier. Many of these devices have been intended primarily for facilitating instruction in a foreign language. These types of apparatus have found some use and have proved satisfactory for some applications. It has been found desirable, however, to provide more readily usable and easily portable devices particularly for communication in different foreign languages. Accordingly, it is an object of this invention to provide an aural and visual communication device including an improved arrangement for facilitating the selection and the reproduction of phrases in different tongues.

It is another object of this invention to provide an improved readily portable device for facilitating communicating between persons speaking different languages.

It is a further object of this invention to provide a readily portable device capable of reproducing written and spoken phrases in different languages and including an improved arrangement for effecting true and accurate aural and visual reproduction of such phrases.

Briefly, in carrying out the objects of this invention in one embodiment thereof, a visual and aural communication device is provided which is small and readily portable and comprises a mechanism for moving a tape or film record into any one of a multiplicity of positions. Each position places a predetermined length of the tape in position for reproduction of both visual image and spoken word. A plurality of sound tracks and pictures are provided for each position and the position may be selected by the visual image, usually a written phrase in a selected language. The audio control is then set to reproduce any selected one of the audio tracks which is the same phrase spoken in a selected language. The ability to select any one of the audible language phrases independently of the visual language selected provides a highly flexible device readily employed for communication by persons speaking different languages. The reproduction of the sound track is effected while the film and picture or visual image remain stationary and thus enable an observer to see the phrase in one language while it is being spoken in another.

Figure 4:
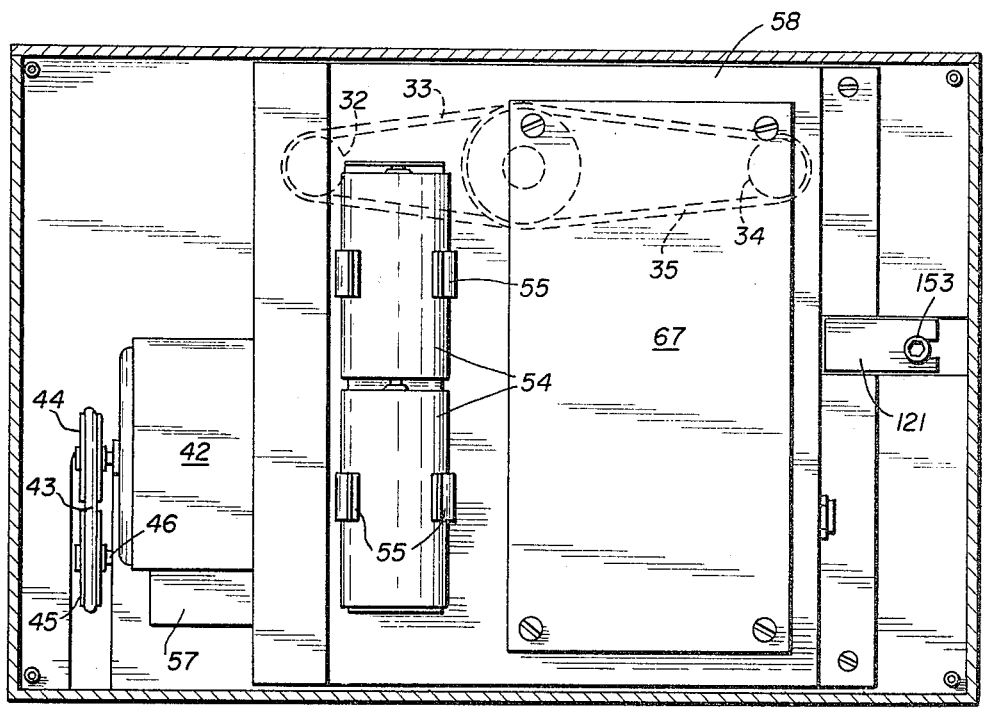
Figure 5:
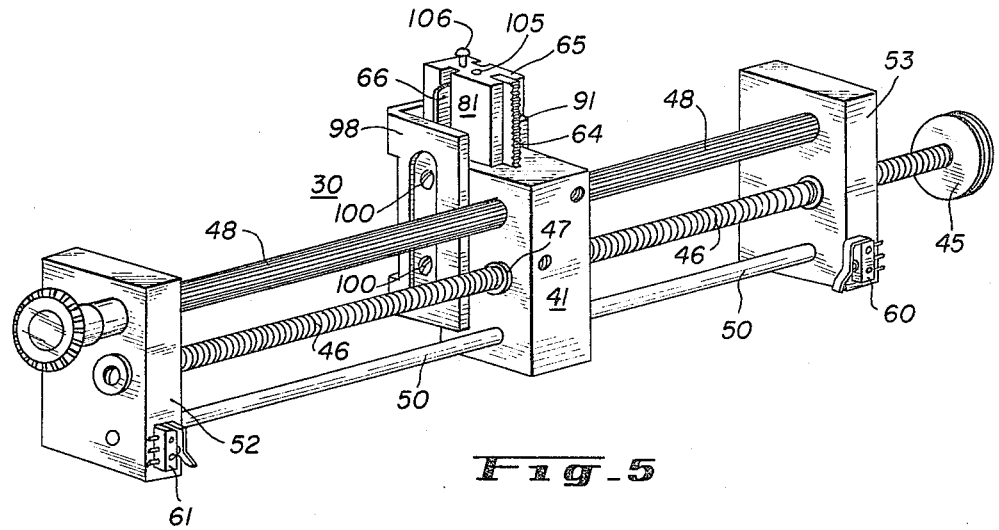
Figure 6:
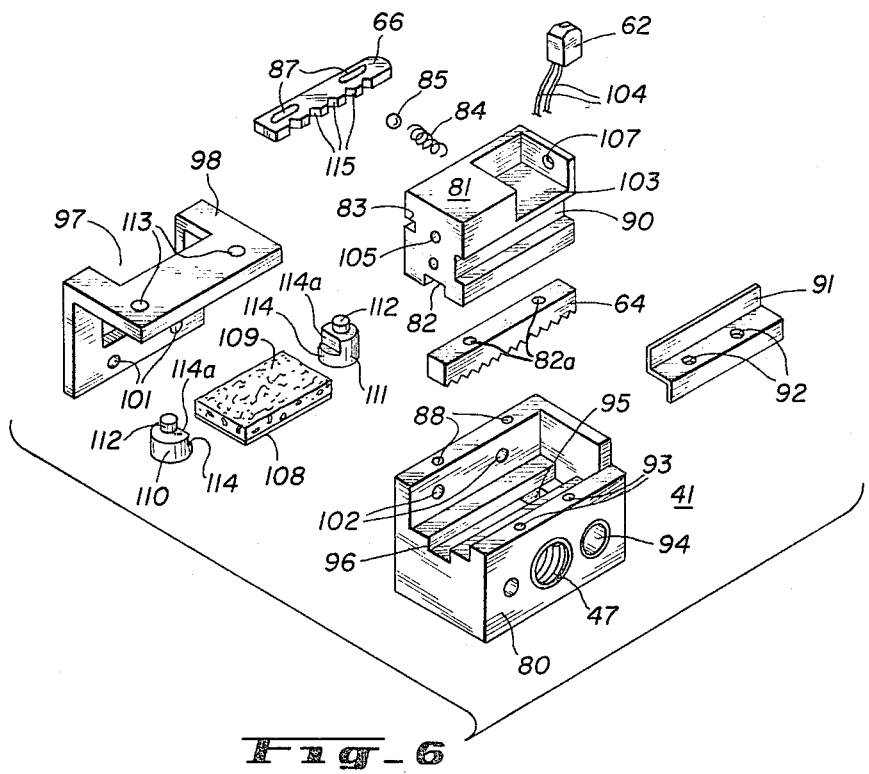

The features of novelty which characterize this invention are pointed out with particularity in the claims annexed to and forming a part of this specification. The invention itself, however, both as to its organization and manner of operation, together with further objects and advantages thereof, will be best understood upon reference to the following description taken in connection with the accompanying drawings in which:

FIG. 1 is a perspective view of a communication device embodying the invention;
FIG. 2 is a plan view of the device with the top wall removed;
FIG. 3 is a side elevation view with the front side wall removed;
FIG. 4 is a bottom plan view with the bottom wall removed;
FIG. 5 is an enlarged perspective view of the audio reproducing mechanism;
FIG. 6 is an exploded perspective view of the audio selector mechanism of FIG. 5 viewed from the right and turned 90° about the longitudinal axis of the mechanism;
FIG. 7 is a plan view of a portion of the tape or film used with the device;
FIG. 8 is an exploded view of the visual selector and projection mechanism;
FIG. 9 is an enlarged side elevation view of a pulley assembly of the device; and
FIG. 10 is a sectional view taken along the line 10—10 of FIG. 9.

Referring now to the drawings, FIG. 1 is a perspective view of a sound and visual image reproducing instrument which embodies the invention and is particularly suited to the purpose of providing communication between persons speaking different languages. The instrument comprises a rectangular cabinet 10 having a top panel 11 provided with a rectangular ground glass screen 12 for reproduction of visual images and controls for operating the device. Sound recordings in the device are reproduced by a suitable speaker 13 shown as a plug-in device connected to the cabinet 10 by a removable plug 14 and cord 15. If desired the speaker may, of course, be incorporated in the cabinet structure in the same manner as speakers of portable transistor radios and the like.

The controls include a phrase selector illustrated as a crank 16 which may be turned to select any one of a plurality of phrases for use in communication. The phrase to be selected by turning of the crank 16 may be located by observing the visual display on the screen 12 which produces an image of the phrase selected. The instrument is preferably provided with an index (not shown) to indicate phrases in accordance with the position of the crank. The selected phrase is projected onto the screen by a light projection system energized by operation of a switch 17. Each phrase is repeated a number of times in different languages and a manual knob 18 is provided to select the language desired.

When the phrase has been selected in the desired language an audible reproduction may be provided by operation of the instrument by turning a manual control knob 19 to the desired position for the language which is to be reproduced audibly and then energizing the instrument by closing a main switch 20 and pressing a starting button 21 to cause audio reproduction of the selected phrase in the desired language. This audio reproduction may be repeated as often as desired by repeated pressing of the starting button 21, the phrase being repeated once for each operation of the button; in addition the phrase appearing on the screen 12 may be changed by moving the selector 18 to any of its other positions to show the phrase in different languages.

The device as illustrated may be made readily portable so that an individual may carry it about with him and use it as occasion arises. The instrument illustrated is a relatively large embodiment, its dimensions being approximately 5 x 7 x 11 inches; this instrument is intended primarily for instructional use and communication in places where it can easily be set down for observation and listening of the persons communicating. More readily portable modifications which are smaller and more convenient for carrying by the individual and which incorporate the speaker within the case employ essentially the same mechanism as that illustrated and described below, the size of the mechanism and the arrangement of the controls being a matter of choice.

The internal mechanism as illustrated in FIGS. 2, 3 and 4 comprises a pair of spools 23 and 24 mounted on parallel axes and carrying a tape or film 25 which is passed from one spool to the other over sprocket wheels 26 and 27. The portion of the tape between the reel 24 and the sprocket 27 passes through an optical projection mechanism 28 and the portion of the tape between the sprockets 26 and 27 passes parallel to an audio reproducing assembly 30 which operates to effect uniform relative movement between the tape record and an audio pickup.

The selector, illustrated as a manual crank 16, may obviously be of different configuration and may be motor driven instead of manual. Regardless of the type of selector, it is arranged to drive the spools 23 and 24 alternatively, the spools being either take-up or supply spools depending upon the direction of rotation of the selector shaft. The driving mechanism for the spools includes a two-way pulley and clutch assembly 31 connected to a pulley 32 through a belt 33, the pulley 32 being connected to drive the shaft of the reel 23. The pulley assembly 31 is connected to a pulley 34 through a belt 35, the pulley 34 being on the shaft of the reel 24 for driving the same.

The operation of the clutch assembly 31, as is described below, is such that when the handle or crank 16 is turned in one direction it drives the pulley 32, the pulley 34 being rotated by the turning of the reel 24 and the clutch mechanism 31 allowing the belt 35 to turn freely. When the crank 16 is turned in the opposite direction the pulley 34 is driven and the pulley 32 is free to turn.

The several parts of the mechanism just described are mounted on a plate 37 which is positioned intermediate the top and bottom walls 39 and 40 of the casing as shown in FIG. 3, the plate 37 constituting a partition within the housing. Power for driving the audio reproducing head carriage indicated at 41 is provided by an electric motor 42 connected by a belt 43 engaging pulleys 44 and 45 to drive a shaft 46. The shaft 46 is threaded as shown in FIG. 5 and engages threads in a bushing 47 in the carriage 41 so that the carriage is driven along a fluted or toothed bar 48 and a smooth guide 50 connected in mounting blocks 52 and 53 at respective ends of the mechanism. Current for driving the motor 42 is supplied by a pair of batteries 54 secured in clips 55 below the plate 37 on a supporting wall structure or plate 58. Power for the audio amplifier is supplied by a battery 57 mounted adjacent the motor casing.

The control circuits for the motor 42 and the circuits for the audio and visual reproducing devices have not been illustrated in order to simplify the drawing and because the details of these circuits are not essential to an understanding of the invention.

The motor is energized upon pressing the starting button 21 and moves the carriage 41 from a position against a stop switch 60 adjacent the mounting block 53 to a position against a reverse switch 61 adjacent the block 52, in which position it is shown in FIG. 2. Engagement with the switch 61 actuates the control circuits to reverse the motor 42 and return the carriage 41 to its position against the stop switch 60, whereupon the motor is stopped. Operation of the switch 61 also de-energizes the audio circuit so that the return of the carriage 41 does not reproduce sound from the sound track on the film 25. The circuits are further arranged so that upon each operation of the starting button 21 the carriage 41 moves from its position against the switch 60 to engage with the switch 61 and returns whereupon it is ready for another operation of the starting button. The mechanism 30 thus provides an arrangement for affording relative movement between a sound pickup and a sound track to reproduce a phrase from the sound track while the visual image on the same film is held stationary in the projection system, and for selecting any one of a plurality of sound tracks regardless of the visual image selected. Other mechanisms for moving the record and pickup with respect to one another may be employed in connection with the laterally moved image and sound track selections.

During the movement of the carriage 41 along the straight section of the film strip 25 a pickup head or transducer shown at 62 in FIG. 6 and mounted on the carriage moves in operating position with respect to any selected one of a plurality of magnetic sound record tracks 63, five of which are shown on the film in FIGS. 3 and 7. The movement of the carriage is relatively slow and at substantially constant speed and a true reproduction of the recorded sound is effected. The movement of the head from one position to another is effected by rotation of the toothed rod 48 which engages a rack 64 shown in FIGS. 5 and 6 to move a slide member 65 up and down with respect to the body of the carriage 41. The pickup head is mounted on the slide 65 and is held by a detent engaging strip or bar 66 and a detent in any one of the selected five positions.

The electronic circuitry including the amplifier for amplifying the signals from the audio pickup is mounted on an insulated plate 67 secured on spacing studs 68 in spaced relation to the plate 58. The electronic circuit components mounted on the plate 67 have not been shown as they are not essential to an understanding of the invention.

The optical system includes a light source 70 and a lens system 71 mounted to move together laterally of a film gate assembly 72 upon manual operation of a pinion gear 73 engaging a rack 74. The gear 73 is connected through a shaft 75 to a beveled gear 76 which meshes with a second gear 77 having a shaft 78 to which the selector knob 18 is connected.

By operation of the knob 18 the light source and projection lens assembly are moved together across the width of the film 25 and may register with any one of five frames on the film 25, each frame being adjacent a respective one of the sound record lines or tracks 63 and being of a size to fit between adjacent lines.

The manual control knobs 18 and 19 are independent of one another and the visual records and sound records may be selected independently for any one position of the record tape so that the selected phrase may be reproduced as spoken in any one of a plurality of languages while the visual record either remains the same or is shifted to a different language. The details of construction and the operation of these visual and sound record selecting mechanisms will be more fully understood on reference to FIGS. 6, 7 and 8.

The carriage 41 comprises a body portion 80 in which the threaded bushing 47 is mounted for engagement with the shaft 46. The block portion 80 is provided with machined guideways to receive the rack 64 and a transducer head carriage or slide 81. The rack 64 is positioned in a channel or groove 82 on the lower side of the slide 81 as viewed in FIG. 6 and is secured by machine screws (not shown) passing through holes 82a in the rack 64 and threaded into the slide 81. The slide 81 is provided with a longitudinal groove 83 along its far side as viewed in FIG. 6 and is provided with a bore (not shown) opening into the bottom of the groove 83 and accommodating a spring 84 and ball detent 85.

When the slide is placed in position on the body 80 the detent engaging strip 66 is placed in the groove 83 in engagement with the ball 85 which is pressed against the detent by the spring 84. The detent engaging strip 66 is then rigidly secured to the block 80 by screws (not shown) passing through elongated openings 87 in the detent and into threaded holes 88 in the body 80. The near side of the slide 81 is provided with an open channel 90 and when the slide is in position on the body 80 a retaining bar 91 is secured on the body 80 by screws (not shown) passing through openings 92 in the bar and engaging threaded holes 93 in the body 80. The retaining bar 91 and the detent strip 66 thus hold the slide 81 in its position on the body 80. An opening 94 in the body 80 accommodates the toothed bar 48 which, when in position, acts as a pinion gear and engages the teeth of the rack 64 through an opening 95 between the bore 94 and the rack channel in the body 80, indicated at 96.

The film or record tape passes through a guide opening 97 in an angle piece 98 which is secured to the body 80 by screws 100 (see FIG. 5) passing through openings 101 in the piece 98 and engaging threaded holes 102 in the body 80.

The pickup head 62 is mounted in a recess 103 in the slide 81 and its electrical leads indicated at 104 are arranged to pass through a longitudinal bore 105 in the slide 81, the head 62 being held in place by a stud or screw 106 passing through an opening 107. When the mechanism is assembled the film 25 is passed through the opening 97 parallel to the top side of the piece 98 as viewed in FIG. 6 and is pressed against the slide 81 into operating position with respect to the pickup 62 by a pressure pad. This pad comprises a smooth surfaced flat pad portion 108 which may be of a rigid plastic material and a portion 109 of sponge-like plastic material. The pad is held against the inside face of the angle piece 98 by a pair of cylindrical studs 111 having screws 112 for engagement with screw holes 113 in the angle piece. The studs 111 are provided with shoulders 114 for engaging and holding the pressure pad and straight side walls 114a for slidably engaging the edges of the film and maintaining its vertical alignment.

It will now be understood that the slide 81 may be moved to any one of a plurality of positions, shown as five in number, as determined by notches 115 in the detent bar 66 and that the exact positions may be adjusted by movement of the bar afforded by the elongated slots 87. Thus the slide may be adjusted to the film or record track being used and, after adjustment and locking of the bar 66, will be held securely in any one of its plurality of selected positions. The slide may be shifted from one positon to another by rotating the knob 19 which is connected to drive the pinion bar 48 through bevel gears 116 and 117.

As described above, the film 25 has in addition to the sound tracks 63 a corresponding set of five visual records 118 each of which is of rectangular configuration and of a size to fit between adjacent ones of the lines 63. The visual images or records are of a size to be reproduced on the screen 12 by operation of the optical lens system 71. The manner in which this selection is made will be more apparent in connection with the following description of FIG. 8 which is an exploded view of the optical selector mechanism 28.

The optical assembly 28 as shown in FIG. 8 includes the projection lens system 71. The film gate assembly 72 includes a stationary member or plate 121 extending transversely of the light path between the lamp 70 and the lens assembly 71 and provided with brackets 122 by which it is rigidly secured to the partition plate 37. A film gate member 123 is arranged to be pressed against the stationary 121 by a bifurcated leaf spring 124 having securing flanges 125 which are secured to the plate 37 with the brackets 122. Guide members 126 define the limits of the film path and guide the film over a light aperture 127. A pair of pins 128 are rigidly secured to the plate 121 and slidably engage holes 130 in the film gate 123 and guide its movement toward and away from the plate 121. The plate 121 is provided with an opening 131 registering with the opening 127.

A carriage or slide 132 is mounted on the plate 121 by a dovetail slide 133 which engages a dovetail slot 134 in the plate 121 in registry with the opening 131. The slide 132 is provided with an aperture 135 and a larger concentric opening 136 in which a plastic bushing 137 is mounted to receive and hold the lamp 70. The rack 74 is secured by machine screws (not shown) in threaded openings 138 in the carriage 132. A detent bar 140 is secured to the slide 121 by machine screws (not shown) which pass through openings 141 in the bar and engage threaded openings 142 in the plate 121. The carriage 132 is provided with a vertical bore (not shown) on the underside thereof in which a helical spring 143 is mounted in engagement with a detent ball 144 which engages detent slots 145 in the bar 141 so that the carriage 132 may be moved to and secured in any position represented by the five detent recesses 145.

In order to carry the optical system 71 in fixed position with respect to the carrage 132 and light 70, the optical system is rigidly secured on an angle piece 146 in a threaded opening 147 and the angle piece extends rearwardly toward the carriage 132 and is secured to the carriage by a screw 148 engaging a threaded hole 150 in the carriage. A tubular spacing post 151 is mounted on the screw 148 which passes through a slot 152 in the rearwardly extending portion of the angle piece 146; when the head of the screw indicated at 153 is tightened it clamps the piece 146 between the head of the screw and the post 151. Thereupon the optical system 71 moves with the carriage 132 so that any of the five images may be placed in the path of the light by movement of the carriage and will be projected by the lens system.

The lens system 71 directs the light beam against a prism 154 mounted on the plate 37 directly below the screen 12 so that the light image is directed onto the screen in a path at right angles to that of the projector. As shown in FIG. 3, the rearwardly extending portion of the angle piece 121 lies on the opposite side of the plate 37 from the film transport assembly.

The manner by which any one of a plurality of phrases may be selected by operation of the crank 16 has been described above in connection with FIGS. 3 and 4. The movement of the film in either direction is effected by the crank with substantially constant tension on the film by operation of the pulley and clutch assembly 31. This assembly includes two pulleys 155 and 156 mounted on the shaft of the crank 16 which is indicated at 157. The two pulleys have frictional face engagement on their adjacent sides, the friction being sufficient to hold the supply reel and maintain tension on the film regardless of which of the reels is the supply reel. The operation of the pulleys in such that when either one of the pulleys is driven by the crank the other acts as a friction brake on the supply reel.

In order to provide this tension maintaining action, each of the pulleys is supplied with a clutch of the overrunning type, the two clutches being effective in opposite directions. This clutching arrangement as illustrated in FIG. 10, showing the pulley 155, comprises three balls or rollers 158 mounted in respective bores 159 formed in the pulley and pressed against the shaft 157 by springs 160 in the bores. In the illustration the bores have been shown as substantially tangential to the shaft, although this may be varied somewhat. The position of the bores is selected to provide the required wedging action of the ball between the shaft and the bore wall; the construction is such that the balls which have been wedged between the pulleys and the shaft by rotation of the shaft in one direction are immediately released upon reverse rotation of the shaft. As shown in FIG. 10, when the shaft 157 is rotated clockwise the balls 158 are wedged between the pulley and the shaft so that the pulley is driven by the shaft. When the direction of rotation of the shaft is reversed, the balls ride with the shaft and the pulley is disconnected from driving relationship with the shaft.

Since the clutches of the pulleys 155 and 156 have their clutching rollers 158 and the bores 159 oppositely oriented, only one pulley can be driven by the shaft at one time. Thus the crank may be turned in either direction and will move the film forward or back during the selection of the desired phrase on the film. It will be understood that the friction between the pulleys 155 and 156 is made sufficient to maintain the desired tension of the film regardless of the direction of rotation, the friction between the pulleys being the same regardless of the direction of their reel rotation.

While the invention has been described in connection with specific details of construction of one modification thereof, various other applications and modifications will occur to those skilled in the art. Therefore, it is not desired that the invention be limited to the details illustrated and described and it is intended by the appended claims to cover all modifications which fall within the spirit and scope of the invention.

We claim:

1. A device for facilitating communication such as that between two persons speaking different languages comprising a portable unit having a screen and an optical system for the reproduction of visual images and an audio system for the reproduction of corresponding sounds, a combined audio and visual record strip comprising a flexible tape having a row of spaced different visual images thereon and a plurality of different sound recordings extending in spaced parallel lines along the strip, means for selecting for reproduction any one of said visual images and independently thereof any one of said sound recordings, and means for reproducing the selected sound recording while the selected visual image remains stationary and is being projected and reproduced on said screen.

2. A device for facilitating communication such as that between two persons speaking different languages comprising a portable unit having a screen and an optical system for the reproduction of visual images and an audio system for the reproduction of corresponding sounds, a combined audio and visual record strip comprising a flexible tape having a series of different visual images extending transversely thereof and a plurailty of different sound recordings extending in spaced parallel lines arranged substantially coextensively along the strip, said optical system including a light source and a projecting lens system arranged to project an image onto said screen from said tape, means for moving said projection system laterally of said strip to select any image from said transverse series of images, said audio system comprising a pickup head and means for selectively moving said head laterally of said strip to position said head for reproduction of any one of said lines, and means for moving said head and said strip at constant speed relative to one another for reproducing the sound record of the selected line while the selected visual image remains stationary and continues to be projected on said screen.

3. A device for facilitating communication such as that between two persons speaking different languages comprising a portable unit having a screen and an optical system for the reproduction of visual images and an audio system for the reproduction of corresponding sounds, a combined audio and visual record strip comprising a flexible tape having a series of different visual images extending transversely thereof and a plurality of different sound recordings extending in spaced parallel lines arranged substantially coextensively along the strip, said optical system including a light source and a projecting lens system arranged to project an image onto said screen from said tape, means for moving said projection system laterally of said strip to select any image from said transverse series of images, said audio system comprising a pickup head and means for selectively moving said head laterally of said strip to position said head for reproduction of any one of said lines, means for moving said head and said strip at constant speed relative to one another for reproducing the sound record of the selected line while the selected visual image remains stationary and continues to be projected on said screen, said record strip having a plurality of successive series of said sound and visual recordings along its length, and means for moving said strip in either direction to effect registry with said optical and audio systems of any selected one of said plurality of series of recordings.

4. A device for facilitating communication such as that between two persons speaking different languages comprising a portable unit having a screen and an optical system for the reproduction of visual images and an audio system for the reproduction of corresponding sounds, a combined audio and visual record strip comprising a flexible tape having a series of different visual images extending transversely thereof and a plurality of different sound recordings extending in spaced parallel lines arranged substantially coextensively along the strip, said optical system including a light source and a projecting lens system arranged to project an image onto said screen from said tape, means for moving said projection system laterally of said strip to select any image from said transverse series of images, said audio system comprising a pickup head and means for selectively moving said head laterally of said strip to position said head for reproduction of any one of said lines, means for moving said head and said strip at constant speed relative to one another for reproducing the sound record of the selected line while the selected visual image remains stationary and continues to be projected on said screen, said record strip having a plurality of successive series of said sound and visual recordings along its length, means for moving said strip in either direction to effect registry with said optical and audio systems of any selected one of said plurality of series of recordings, two rotatable record strip reels for receiving the respective ends of said record strip, said strip moving means including a shaft having two drive pulleys thereon, two driven pulleys one for each of said reels, belts connecting each of said driven pulleys to a respective one of said drive pulleys, means including an overrunning clutch connecting each of said drive pulleys and said shaft for connecting said shaft to drive one of said drive pulleys when rotated in one direction and to drive the other pulley when rotated in the other direction, said drive pulleys having frictional engagement with one another whereby a braking action is applied to the one of said reels not being driven.

5. A device for facilitating communication such as that between two persons speaking different languages comprising a portable unit having a screen and an optical system for the reproduction of visual images and an audio system for the reproduction of corresponding sounds, a combined audio and visual record strip comprising a flexible tape having a row of spaced different visual images thereon and a plurality of different sound recordings extending in spaced parallel lines along the strip, said optical system including a gate member for guiding and holding said record strip, carriage means slidably mounted on said gate member and having portions on both sides thereof, a light source mounted on one of said portions, a projection lens mounted on the other of said portions in alignment with said source, means for selecting for reproduction any one of said visual images and independently thereof any one of said sound recordings, said selecting means including means for moving said carriage means with respect to said gate means and for holding said carriage in any one of a plurality of positions in registry with any respective one of the visual images in said row, and means for reproducing the selected sound recording while the selected visual image remains stationary and is being projected and reproduced on said screen.

6. A device for facilitating communication such as that between two persons speaking different languages comprising a portable unit having a screen and an optical system for the reproduction of visual images and an audio system for the reproduction of corresponding sounds, a combined audio and visual record strip comprising a flexible tape having a row of spaced different visual images thereon and a plurality of different sound recordings extending in spaced parallel lines along the strip, means for selecting for reproduction any one of said visual images and independently thereof any one of said sound recordings, means for holding a portion of said strip in straight configuration, a sound pickup head, a carriage for said head, a guide track for said carriage affording movement of said carriage along a path parallel to said portion of said strip, means including a slide for mounting said head on said carriage, said slide being movable on said carriage transversely of said guide track and being positioned to hold said head in operating position with respect to a sound track on said strip, a motor and a screw engaging said carriage for driving said carriage along said guide track, a rack on said slide, and an elongated pinion gear extending parallel to said track and continuously engaging said rack for moving said slide on said carriage to position said head in operating relationship with respect to any one of said sound recordings whereby sound may be reproduced from said recordings while said strip is stationary and a selected visual image is being presented on said screen.

References Cited by the Examiner

UNITED STATES PATENTS

| | | | |
|---|---|---|---|
| 2,673,041 | 3/1954 | Hittle | 242—55.12 |
| 3,020,360 | 2/1962 | Gratian et al. | 35—35.2 X |
| 3,078,593 | 2/1963 | Miller | 35—34.3 X |
| 3,090,573 | 5/1963 | Matovich | 242—55.12 |
| 3,142,909 | 8/1964 | Irazoqui | 35—35.3 |

FOREIGN PATENTS

| | | |
|---|---|---|
| 727,125 | 3/1955 | Great Britain. |

EUGENE R. CAPOZIO, *Primary Examiner.*

W. H. GRIEB, *Assistant Examiner.*